(12) United States Patent
Nielsen et al.

(10) Patent No.: US 7,645,403 B2
(45) Date of Patent: Jan. 12, 2010

(54) METHOD OF IMPROVING COLOR QUALITY IN AN OBJECT PRODUCED BY SOLID FREEFORM FABRICATION

(75) Inventors: Jeffrey Allen Nielsen, Corvallis, OR (US); Steven T. Castle, Philomath, OR (US); David C Collins, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 927 days.

(21) Appl. No.: 10/603,896

(22) Filed: Jun. 24, 2003

(65) Prior Publication Data

US 2004/0262803 A1   Dec. 30, 2004

(51) Int. Cl.
 *B29C 41/02* (2006.01)
 *B41J 2/04* (2006.01)
(52) U.S. Cl. .................... 264/113; 264/308; 347/54; 347/96
(58) Field of Classification Search ................. 264/113, 264/308; 347/1, 54, 96
See application file for complete search history.

(56) References Cited

U.S. PATENT DOCUMENTS

| | | | |
|---|---|---|---|
| 5,059,266 A | 10/1991 | Yamane et al. | |
| 5,133,803 A | 7/1992 | Moffatt | |
| 5,140,937 A | 8/1992 | Yamane et al. | |
| 5,181,045 A | 1/1993 | Shields et al. | |
| 5,198,023 A | 3/1993 | Stoffel | |
| 5,428,383 A * | 6/1995 | Shields et al. | 347/96 |
| 5,679,143 A | 10/1997 | Looman | |
| 5,997,795 A | 12/1999 | Danforth et al. | |
| 6,066,285 A | 5/2000 | Kumar | |
| 6,129,872 A | 10/2000 | Jang | |
| 6,165,406 A | 12/2000 | Jang et al. | |
| 6,253,116 B1 | 6/2001 | Zhang et al. | |
| 6,259,962 B1 | 7/2001 | Gothait | |
| 6,280,785 B1 | 8/2001 | Yang et al. | |
| 6,401,002 B1 | 6/2002 | Jang et al. | |
| 2002/0096112 A1 | 7/2002 | Coe | |
| 2002/0167101 A1 | 11/2002 | Tochimoto et al. | |
| 2004/0145088 A1* | 7/2004 | Patel et al. | 264/308 X |
| 2004/0147630 A1* | 7/2004 | Schmid et al. | 523/160 |

FOREIGN PATENT DOCUMENTS

| | | |
|---|---|---|
| EP | 0431924 B1 | 1/1996 |
| JP | 6106841 | 4/1994 |
| JP | 5208548 | 8/1998 |
| JP | 2001-150556 | 6/2001 |
| JP | 2002-307562 | 10/2002 |
| JP | 2003016030 A | 1/2003 |
| WO | WO 03/016067 A2 | 2/2003 |
| WO | WO03016030 | 2/2003 |

OTHER PUBLICATIONS

European Search Report for Application No. EP 04 25 3526. Report issued Oct. 20, 2006.

* cited by examiner

*Primary Examiner*—Leo B Tentoni

(57) ABSTRACT

A method for improving color quality in an object created by a solid freeform fabrication system keeps a colorant in an ejected material near a surface of the object.

40 Claims, 3 Drawing Sheets

METHOD OF IMPROVING COLOR QUALITY IN AN OBJECT PRODUCED BY SOLID FREEFORM FABRICATION

THE FIELD OF THE INVENTION

The present invention relates generally to solid freeform fabrication. More specifically, the present invention relates to the coloring of objects produced by solid freeform fabrication.

BACKGROUND OF THE INVENTION

Solid freeform fabrication is a process for manufacturing three-dimensional objects, for example, prototype parts, models and working tools. Solid freeform fabrication is an additive process in which an object, which is described by electronic data, is automatically built, usually layer-by-layer, from base materials.

Several principal forms of solid freeform fabrication involve a liquid ejection process. There are two main types of solid freeform fabrication that use liquid-ejection: binder-jetting systems and bulk-jetting systems.

Binder-jetting systems create objects by ejecting a binder onto a flat bed of powdered build material. Each powder layer may be dispensed or spread as a dry powder or a slurry. Wherever the binder is selectively ejected into the powder layer, the powder is bound into a cross section or layer of the object being formed.

Bulk-jetting systems generate objects by ejecting a solidifiable build material and a solidifiable support material onto a platform. The support material, which is temporary in nature, is dispensed to enable overhangs in the object and can be of the same or different material from the object.

In both cases, fabrication is typically performed layer-by-layer, with each layer representing another cross section of the final desired object. Adjacent layers are adhered to one another in a predetermined pattern to build up the desired object.

In addition to selectively forming each layer of the desired object, solid freeform fabrication systems can provide a color or color pattern on each layer of the object. For example, inkjet technology can be employed in which a number of differently colored inks are selectively ejected from the nozzles of a liquid ejection apparatus and blended on the build material to provide a full spectrum of colors. In binder-jetting systems, the binder may be colored such that the functions of binding and coloring are integrated. In bulk-jetting systems, the build material may be colored. On each individual layer of the object, conventional two-dimensional multi-pass color techniques and half-toning algorithms can be used to hide defects and achieve a broad range of desired color hues in the completed object.

One of the on-going deficiencies of the solid freeform fabrication techniques described above is inaccurate color reproduction in fabricated objects. In particular, colorants (dyes or pigments) soak below the surface of the object as it is fabricated, causing the apparent colors of the object to become faded as more air and build material come between the colorant and an observer. Additionally, when two or more different colorants are used in adjacent portions of an object, bleeding occurs as one colorant invades into another colorant and the border between the colorants becomes ragged.

In some previous solid freeform fabrication systems that employ ink-jet technology to add color to the object being fabricated, color has been added by printing a desired color throughout each layer of the object being fabricated. In other solid freeform fabrication systems a desired apparent coloring in an object is obtained by varying the color of successive layers that are nested inwardly from a surface of the object.

SUMMARY OF THE INVENTION

In one of many possible embodiments, the present invention provides a method of improving color quality in an object created by a solid freeform fabrication system by causing a reaction that keeps a colorant in an ejected material near a surface of the object.

DESCRIPTION OF THE PREFERRED EMBODIMENTS

Figure 1:
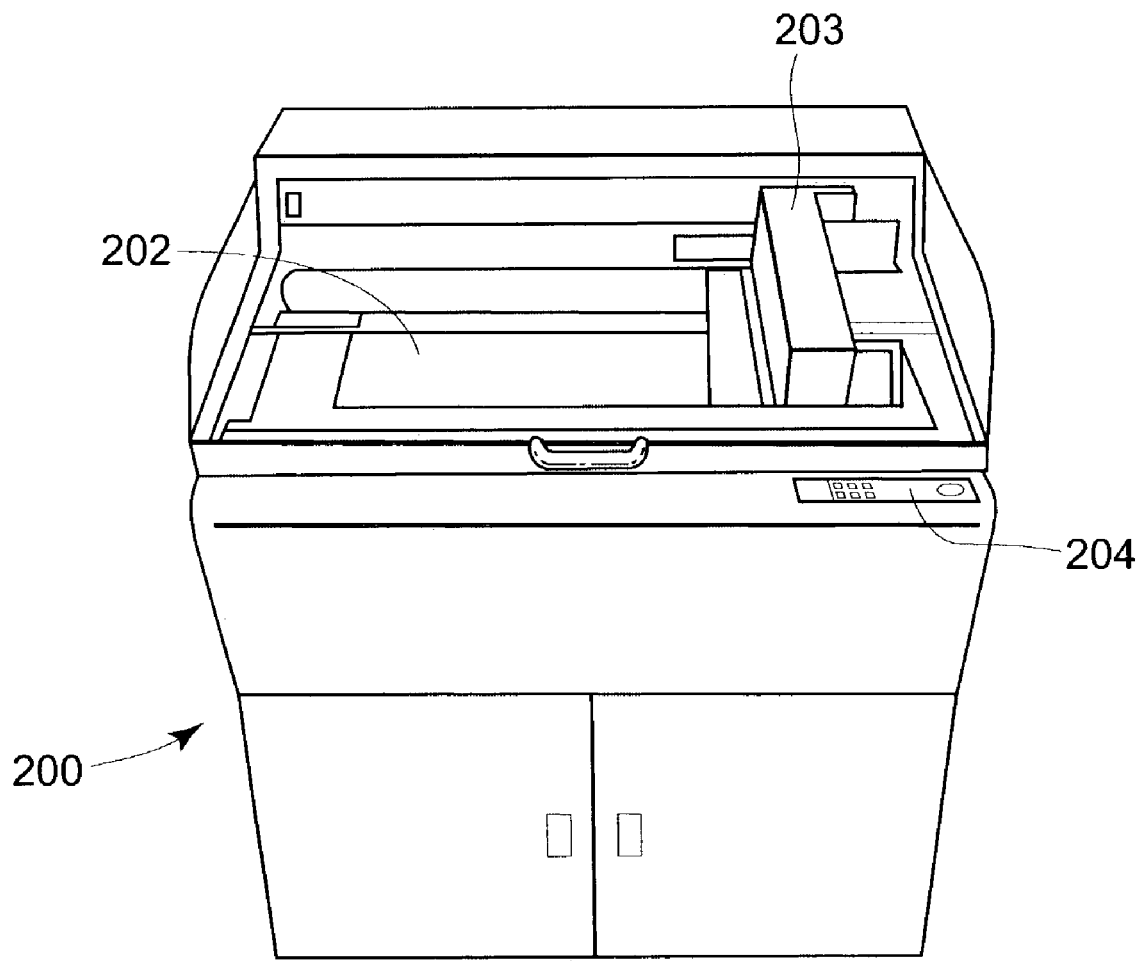
FIG. 1 is a perspective view of a solid freeform fabrication system that may be used to implement embodiments of the present invention.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. Also, the terms "small" and "large" indicate relative sizes to one another, and do not indicate any specific size, volume, mass, or shape. It is to be understood that other embodiments may be utilized and structural or logical changes may be made without departing from the scope of the present invention. The following detailed description, therefore, is not to be taken in a limiting sense, and the scope of the present invention is defined by the appended claims.

The present specification describes techniques for creating objects by a solid freeform fabrication system, preferably using fluid ejection technology, while improving the accuracy of the apparent color of the objects. As used in this specification and the appended claims, the term "ejected material" is used broadly to mean any substance ejected by a fluid ejection head to color, bind or form a portion of an object being fabricated. Consequently, "ejected material" includes, but is not limited to, ink, colorant, toner, binder, build material and support material. The term "colorant" is used to mean any material for coloring an object or build material in a freeform fabrication system. "Colorant" includes, but is not limited to, ink, printing fluid, toner, dye, pigment, etc. The term "binder" is used to mean adhesive or any other substance that is ejected to selectively bind a build material together into a desired object. The term "build material" is used to mean any material from which a freeform fabrication system forms a desired object and may include a powdered build material or a jetted build material, such as a jetted polymer. The term "powder" refers to a collection of non-permanently-bound particles that are distributed in a dry or slurry state using mechanical, jetting or other means. The term "apparent color" refers to the coloration of the object as it appears to an observer. The colorant that contributes to "apparent color" may be located at the actual surface of the object or inside the object and not at the object's surface. Additionally, the object being formed may be partially translucent or transparent with a colored region located inside the object, which has an apparent color. Thus "apparent color" refers to the coloration of the object as it appears to an observer, whether that coloration appears at the object's surface or is interior to the object. The "apparent color" is determined by, but potentially independent of, the specific colorants that contribute to the apparent color, where those colorants reside and how those colorants are distributed. The "apparent color" of the object controlled by the embodiments of the present invention includes the chromatic aspects: hue, chroma, lightness, and the geometric aspects: gloss, haze, etc.

Referring now to the figures, and in particular to FIG. 1, one solid freeform fabrication system using liquid ejection technology is described. Embodiments of the present invention may be incorporated into the freeform fabrication system shown. The solid freeform fabrication system (200) of FIG. 1 is described in terms of a binder-jetting system, in which an adhesive or binder material is ejected into a bulk powder build material to form the object. However, the freeform fabrication system may alternately be a bulk-jetting system in which a solidifiable build material is ejected to form the object.

In the solid freeform fabrication system (200) of FIG. 1, a build material such as a bulk powder substance is used to form each individual layer of a desired object. To build each layer, a quantity of powder build material is provided from a supply chamber. A roller, preferably incorporated into a moving stage (203), distributes and compresses the powder to a desired thickness at the top of a fabrication chamber (202). In various embodiments of solid freeform fabrication systems, the powder build material may be a loose powder that is mechanically spread and compressed, as described above, or alternately a slurry powder that is spread by jetting the slurry and then allowed to dry to a brick state.

A liquid ejection apparatus (e.g., a drop-on-demand liquid ejection apparatus, etc.) may be contained by the moving stage (203) of the solid freeform fabrication system (200). Alternatively, the solid freeform fabrication system (200) may include multiple liquid ejection apparatuses, each separately containing one or more ejection fluid. The moving stage (203) of the solid freeform fabrication system (200) often includes inkjet technology, such as drop-on-demand liquid ejection apparatus, for ejecting material to form the layers of the desired object. Using drop-on-demand technology, the moving stage (203) may include one or more drop-on-demand printheads, each printhead having a plurality of nozzles, to eject drops of material that is clear or colored in a selective pattern to create the object being fabricated. The printheads may also be separate from the moving stage (203) according to some embodiments.

When the moving stage (203) has distributed the powder build material, the fluid ejection apparatus deposits adhesive or binder onto the powder in the fabrication chamber (202) in a two dimensional pattern. This two dimensional pattern is a cross section of the desired object being fabricated.

As the binder is ejected into the powdered build material, the powder becomes bonded in the areas where the binder is deposited, thereby forming a solid cross-sectional layer of the desired object. The process is repeated with a new layer of powder being applied over the top of the previous layer in the fabrication chamber (202). A next cross-section of the desired object may then be built by ejecting binder into the new powder layer. In addition to forming each cross-sectional layer of the object being fabricated, the adhesive binder can also bind adjacent or successive layers together.

In addition to solid freeform fabrication systems that apply binder to a powdered build material (i.e., binder-jetting systems), the principles described herein may also be applied to solid freeform fabrication systems that eject all of the build material and support material from a fluid ejection apparatus (i.e., bulk-jetting systems). For example, the techniques described herein may be applied to any jetted solidifiable material system that provides 100% of the object build material and/or support material from the fluid ejection apparatus to form the desired object or a cross-section of the desired object. Jetted solidifiable or hardenable materials include, but are not limited to pre-polymers, polymers, and waxes. A support material may be used to provide temporary structural support for the build material, such as in "overhang" areas of the object. The fluid ejected build material and/or support material solidify or harden to form a layer of the object. A next cross-section of the desired object may then be built by ejecting build material and/or support material onto the previously formed layer. In addition to forming each cross-sectional layer of the object being fabricated, the ejected build material can also bind adjacent or successive layers together.

Whether ejecting a binder into a powdered build material or ejecting a solidifiable fluid build material, the process continues until the desired object is entirely formed within the fabrication chamber (202). Any extra powder that is not bonded by the ejected binder, or ejected support material, is removed leaving only the fabricated object. A user interface or control panel (204) is provided to allow the user to control the fabrication process.

In both binder-jetting systems and bulk-jetting systems, the ejected binder or ejected build material may be colored with ink, dye, pigment, or other colorants to provide a desired color for the ejected binder or build material. By using appropriate combinations of colored binders or build materials, any desired color or color pattern may be created for selected portions of the object being formed.

In typical inkjet printing systems, three colors are used and mixed in various ratios as desired to produce the full spectrum of colors. The three colors used are yellow (Y), cyan (C) and magenta (M). Other printing systems use hexachrome printing that further includes the colors violet, orange, and green. In some instances a supply of black (K) colorant and/or white (W) colorant is also used. When these colors are blended in various ratios, virtually any desired color can be produced. This process of blending base colors to produce other colors is sometimes referred to as half-toning. Similar principles can be used to create a full spectrum of colors in a three-dimensional object being fabricated through rapid prototyping in a solid freeform fabrication system.

Because color can be primarily a surface property, the color projection of the object does not need to proceed very far into the interior of the object being fabricated. The necessary depth of the coloring will depend on the base material being used to fabricate the object. Materials that are more translucent may require projecting the color deeper into the object. In powder-based binder-jetting systems, the powder build material is typically not completely transparent and is somewhat turbid or translucent or opaque.

By way of further explanation, consider a point on an object. The color of a point on a layer of the object is determined by the color at that point and the colors of the points adjacent to that point in the same layer of the object (half toning). The color of the point is also affected by the color of points nearby in layers above and below. The fact that the color at any given point is affected by the color of all surrounding points is specific to the three-dimensional nature of rapid prototyping.

The present invention provides for the improvement of color quality in objects created by a solid free-form fabrication system that uses a fluid ejection process to build successive layers of the object being fabricated. Colorant in the ejected material (either an ejected binder or an ejected build material) is caused to remain near the surface of the layer being fabricated, such that the color accuracy of the layer, and thus the completed object, is improved by, for example, reducing "washed out" colors and maintaining sharp and crisp borders between different colors in the object.

The colorant in the ejected material is caused to remain near the surface of each layer of the object by precipitating (or "crashing") the colorant out of the ejected material as the object is formed. Without subscribing to any particular theory, applicants believe that by forcing a colorant to become insoluble (and thereby precipitate out of the ejected material) as the object is formed, the migration of the colorant will be inhibited, thereby reducing penetration of the colorant into the object and improving the sharpness or crispness of borders between different adjacent colors. The "force" used to make the colorant crash or precipitate out of solution may be, for example, a pH reaction or a cationic-anionic reaction.

For example, certain dye classes become insoluble under specific and well-defined pH conditions. Examples of such dyes are carboxylated dyes, such as azo dyes, xanthene dyes, copper phtyalocyamine dyes, and other dyes whose solubility decreases as pH is lowered. While the specific examples provided are directed to the use of dyes whose solubility decreases as pH is lowered, it is also possible to employ dyes whose solubility decreases as pH is increased. In addition, other colorants that exhibit differential solubility with changes in pH are also useful in the practice of the invention.

Generally, anionic-cationic reactions are used with pigment colorants. In pigmentation solutions, a dispersant is used to maintain the pigment in suspension. The dispersant is sensitive to anionic-cationic reactions such that an anionic-cationic reaction causes the dispersant to become ineffective at suspending the pigments, allowing the pigments fall out of suspension. Some dispersants are alternately sensitive to pH reactions.

Figure 2:
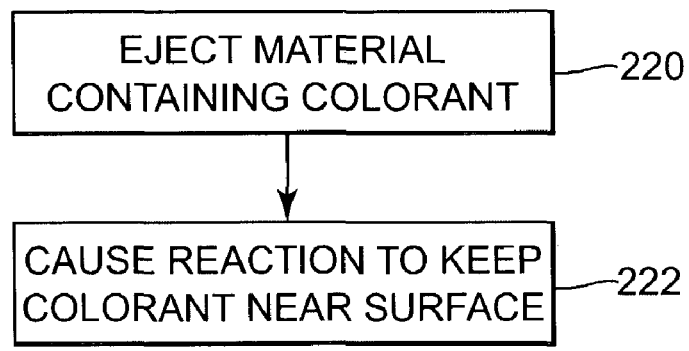
FIG. 2 is a flow chart illustrating one method according to the invention for producing improved coloring of an object.

Referring to FIG. 2, in one embodiment according to the invention, at least one material containing a colorant is ejected by a solid freeform fabrication system to create a cross-sectional layer of an object (step 220). After the at least one material is ejected, a reaction is initiated to cause the colorant in the ejected material to stay near the surface of the layer being formed (step 222).

Figure 3:
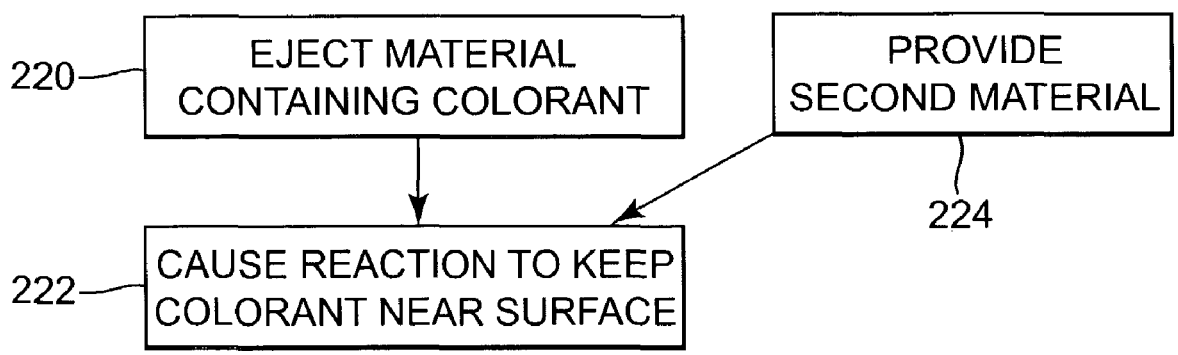
FIG. 3 is a flow chart illustrating an alternate method according to the invention for producing improved coloring of an object.
Figure 4:
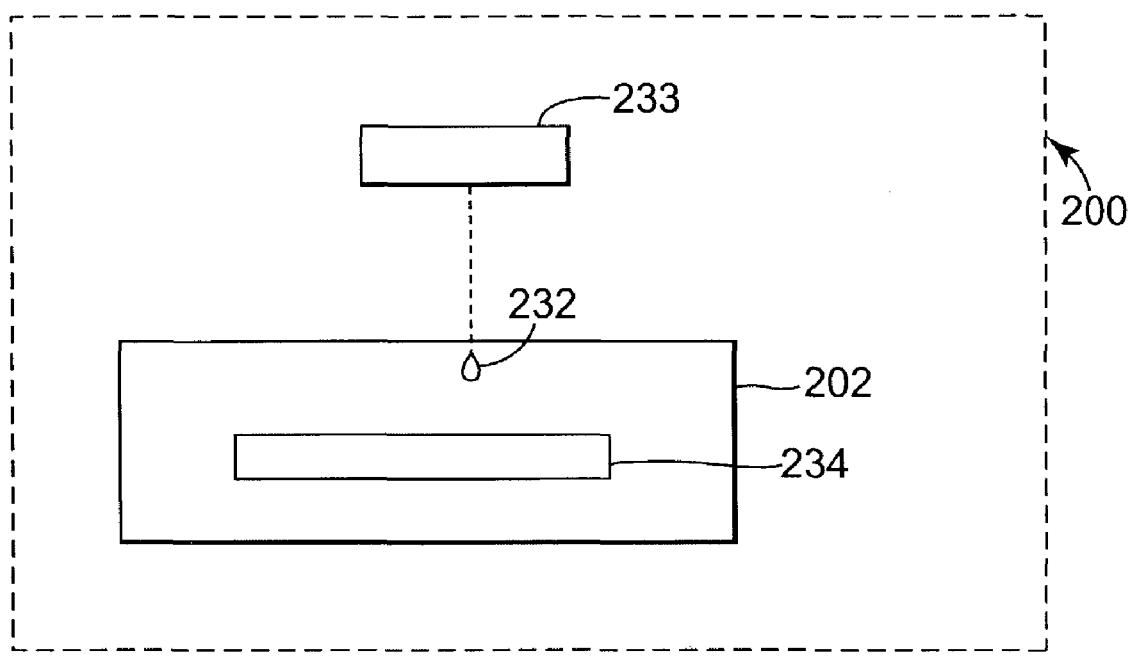
FIG. 4 is a schematic representation of one embodiment of a solid freeform fabrication system according to the invention.

In one embodiment according to the invention, as illustrated in FIG. 3, a second material is provided (step 224) to react with the at least one ejected material containing a colorant of step (220) and precipitate the colorant out of the at least one ejected material in the reaction of step (222).

Where the solid freeform fabrication system 200 is a binder-jetting system, as illustrated schematically in FIG. 4, the at least one ejected material containing a colorant of step (220) is a binder (232). The binder (232) is ejected from an ejection apparatus (233) such as a printhead. The binder (232) is ejected into a powder build material (234) in fabrication chamber (202) to solidify or bond those areas where the binder (232) is deposited, thereby forming a solid cross-sectional layer of the desired object. The reaction of step (222) that keeps the colorant in the ejected material near a surface of the layer being formed is a reaction that causes the colorant to precipitate out of the binder (232).

In one embodiment according to the invention, the ejected material of step (220) is binder (232), and the second material of step (224) is powder build material (234). The precipitory reaction of step (222) occurs between the colorant in the ejected binder (232) and the powder build material (234). The reaction of step (222) may be a pH reaction, where the colorant is sensitive to pH conditions. The pH of the powder (234) is sufficiently different from the pH of the binder (232) to cause the colorant to precipitate out of the binder (232) upon contact with the powder (234). For example, the solubility of the colorant may decrease as pH is lowered, such that contact with a powder (234) having a lower pH causes the colorant to precipitate out of the binder (232). Alternately, the solubility of the colorant may decrease as pH is increased, such that contact with a powder (234) having a higher pH causes the colorant to precipitate out of the binder (232).

The desired precipitory reaction may be seen at a pH difference of about 2.5 units. Further and nearer complete control of the precipitation of the colorant results when the pH difference is further increased. The upper end of pH difference is not governed by the efficacy of precipitating or "crashing out" the colorant, but rather by material compatibility in the ejected materials and the material delivery system. In other words, with a pH that is too high or too low, the ejected materials will damage the ejection apparatus (233) printheads. Thus, an upper end of pH difference is in the range of about 7 (e.g., an acidic pH of about 3 and a basic pH of about 10). However, those skilled in the art will recognize that future material delivery and ejection apparatuses may have higher tolerances to more extreme fluids (e.g., those fluids having very high or very low pH values).

Rather than a pH reaction, the precipitory reaction of step (222) may be a cationic-anionic reaction between the colorant in the binder (232) and the powder (234). For example, the colorant may be anionic, while the powder build material (234) has a cationic component. The anionic colorant precipitates out of the binder (232) upon contact with the cationic powder (234). Conversely, the colorant may be cationic, with the powder build material (234) having an anionic component.

A plurality of binders (232) having different color colorants (i.e., yellow, cyan, magenta, violet, orange, green, black, white, etc.) or no colorant may be provided, such that a full spectrum of colors may be reproduced. The colorants in each of the different binders (232) may independently react in either a pH or cationic-anionic reaction with the powder build material (234) to cause the colorants to precipitate out of the binders (232). Alternately, the colorants in the different binders (232) may react with other binders (232) in either a pH or cationic-anionic reaction to cause the colorants to precipitate out.

Figure 5:
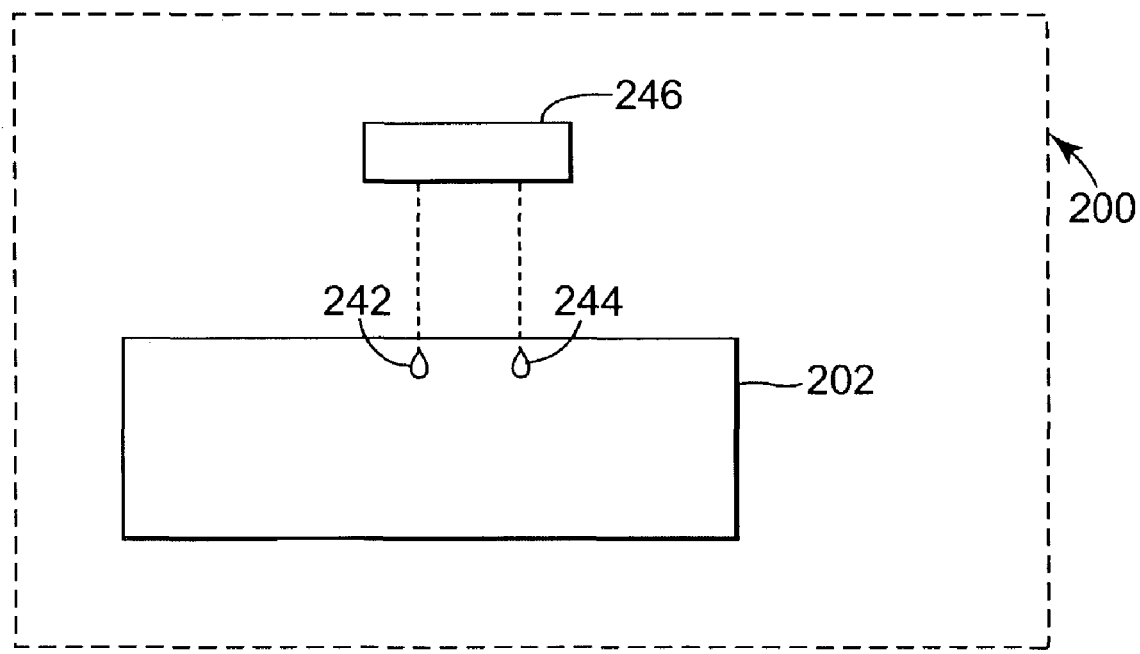
FIG. 5 is a schematic representation of an alternate embodiment of a solid freeform fabrication system according to the invention.

In another embodiment according to the invention, as illustrated schematically in FIG. 5, at least a first material (242) and a second material (244) are ejected by an ejection apparatus (246) into fabrication chamber (202) of solid freeform fabrication system 200 to create a cross-sectional layer of an object. That is, both the material containing a colorant of step (220) and the second material of step (224) are ejected materials.

In one embodiment, the first material (242) contains a colorant, and the second material (244) does not contain a colorant (i.e., the second material (244) is clear). Alternately, both the first material (242) and the second material (244) contain colorants. The first and second materials (242, 244) are formulated such that upon contact and/or mixing of the first and second ejected materials (242, 244), a reaction causes the colorants to precipitate out of the ejected materials.

The precipitory reaction of step (220) is caused, in one embodiment, by a pH reaction between the first and second ejected materials (242, 244). The colorants are sensitive to pH conditions. The pH of the ejected materials (242, 244) are sufficiently different from each other to cause the colorants to precipitate out of the ejected materials (242, 244) upon contact and mixing of the materials. For example, the solubility of the colorant may decrease as pH is lowered, such that contact or mixing with a lower pH material causes the colorant to precipitate out. Alternately, the solubility of the colorant may decrease as pH is increased, such that contact or mixing with a higher pH material causes the colorant to precipitate out.

The precipitory reaction of step (220) is caused, in another embodiment, by a cationic-anionic reaction between the first and second ejected materials (242, 244). For example, the first material (242) has a colorant which is anionic, while the second material (244) has a cationic component. The colorant precipitates out of the first material (242) upon contact and mixing of the first and second materials (242, 244). Conversely, the colorant in the first ejected material (242) may be cationic, with the second material (244) having an anionic component.

Where the solid freeform fabrication system of FIG. 5 is a binder-jetting system, at least the first ejected material (242) is a binder to solidify or bond a powder build material in those areas where the binder is deposited. The second ejected material (244) may alternately be a binder or another material to cause a precipatory reaction with the colorant of the first ejected material (242). As the first ejected material (242) binder contacts or is mixed with the second material (244), either a pH or cationic-anionic reaction as described above causes the colorant to precipitate out of the first ejected material (242). A binder-jetting system may have plurality of binders, each having different color colorants (i.e., yellow, cyan, magenta, violet, orange, green, black, white, etc.) or no colorant, such that a full spectrum of colors may be reproduced.

Where the solid freeform fabrication system of FIG. 5 is a bulk-jetting system, at least the first ejected material (242) is a solidifiable or hardenable build material containing a colorant. The second ejected material (244) may alternately be a solidifiable or hardenable build material, or another material, to cause a precipatory reaction with the colorant of the first ejected build material (242). As the first ejected build material (242) contacts or is mixed with the second ejected material (244), either a pH or cationic-anionic reaction as described above causes the colorant to precipitate out of the first ejected build material (242).

In one embodiment, the second ejected material (244) is a solidifiable or hardenable support material. In this embodiment, the support material must be deposited around the entire exterior surface or shell of the object being fabricated, so that the desired precipitory reaction may occur at the surface of the object. Because the apparent color of an object can be primarily a surface property, the precipitory reaction does not need to occur into the interior of the object being fabricated.

In another embodiment, the second ejected material (244) is a build material having a colorant different from the first ejected material (242), or no colorant. By providing a plurality of solidifiable or hardenable build materials, each having different color colorants (i.e., yellow, cyan, magenta, black, violet, orange, green, white, etc.) or no colorant, a full spectrum of colors may be reproduced. For example, a precipitory reaction may occur between black solidifiable build material and the three primary colors of solidifiable build material, or between white solidifiable build material and the three primary colors of solidifiable build material. This would maintain "crispness" of color transitions between dark and light colors.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of improving color quality in an object created by a solid freeform fabrication system that uses a fluid ejection process to build successive layers of the object being fabricated, the method comprising:
    ejecting a first material to form a layer of a three-dimensional object, the first material containing a colorant;
    providing a second material; and
    causing a reaction between the first material and the second material that renders the colorant insoluble and reduces penetration of the colorant to keep the colorant near a surface of the layer,
    wherein the first material comprises a binder or a build material, and the second material comprises a binder or a build material.

2. The method of claim 1, wherein causing a reaction comprises precipitating the colorant out of the first material.

3. The method of claim 2, wherein causing a reaction further comprises the second material precipitating the colorant out of the first material.

4. The method of claim 3, wherein ejecting a first material comprises ejecting a binder.

5. The method of claim 4, wherein providing a second material comprises ejecting a second binder.

6. The method of claim 4, wherein providing a second material comprises providing a powdered build material into which the first material is ejected.

7. The method of claim 1, wherein ejecting a first material comprises ejecting a solidifiable build material.

8. The method of claim 1, wherein providing a second material comprises ejecting a solidifiable support material.

9. The method of claim 2, wherein precipitating the colorant out of the first material comprises causing a pH reaction.

10. The method of claim 9, wherein the colorant in the first material is sensitive to pH, and wherein causing a pH reaction comprises the second material having a pH sufficiently different from a pH of the first material to cause the colorant to precipitate out of the first material upon contact of the first and second materials.

11. The method of claim 10, wherein the pH of the second material is lower than the pH of the first material.

12. The method of claim 11, wherein the colorant in the first material is a dye selected from the group consisting of carboxylated azo dyes, carboxylated copper phtyalocyamine dyes, carboxylated xanthene dyes, and dyes whose solubility decreases as pH is lowered.

13. The method of claim 10, wherein the pH of the second material is higher than the pH of the first material.

14. The method of claim 10, wherein the pH differential between the first material and the second material ranges from about 2.5 to 7 units.

15. The method of claim 2, wherein precipitating the colorant out of the first material comprises causing an anionic-cationic reaction.

16. The method of claim 15, wherein the colorant of the first material is anionic, and wherein causing a reaction comprises providing a cationic second material to cause the colorant to precipitate out of the first material upon contact of the first and second materials.

17. The method of claim 15, wherein the colorant of the first material is cationic, and wherein causing a reaction comprises providing an anionic second material to cause the colorant to precipitate out of the first material upon contact of the first and second materials.

18. The method of claim 1, wherein the colorant is a dye.

19. The method of claim 1, wherein the colorant is a pigment.

20. A method of improving color quality in a three-dimensional object created by a solid freeform fabrication system that uses a fluid ejection process to build successive layers of the three-dimensional object being fabricated, the method comprising:
   forming a layer of the three-dimensional object, including providing contact between a first material and a second material, the first material containing a colorant; and
   forcing the colorant to become insoluble and precipitating the colorant out of the first material upon contact of the first and second materials such that the colorant remains near a surface of the layer,
   wherein the first material comprises a binder or a build material, and the second material comprises a binder or a build material.

21. The method of claim 20, wherein precipitating the colorant out of the first material keeps the colorant near a surface of the object.

22. The method of claim 20, wherein the first material comprises a binder.

23. The method of claim 22, wherein the second material comprises a second binder.

24. The method of claim 22, wherein the second material comprises a powdered build material into which the first material is ejected.

25. The method of claim 20, wherein the first material comprises a solidifiable build material.

26. The method of claim 20, wherein precipitating the colorant out of the first material comprises causing a pH reaction.

27. The method of claim 20, wherein the colorant in the first material is sensitive to PH, and wherein causing a pH reaction comprises the second material having a pH sufficiently different from a pH of the first material to cause the colorant to precipitate out of the first material upon contact of the first and second materials.

28. The method of claim 27, wherein the pH of the second material is lower than the pH of the first material.

29. The method of claim 28, wherein the colorant in the first material is a dye selected from the group consisting of carboxylated azo dyes, carboxylated copper phtyalocyamine dyes, carboxylated xanthene dyes, and dyes whose solubility decreases as pH is lowered.

30. The method of claim 27, wherein the pH of the second material is higher than the pH of the first material.

31. The method of claim 27, wherein the pH differential between the first material and the second material ranges from about 2.5 to 7 units.

32. The method of claim 20, wherein precipitating the colorant out of the first material comprises causing an anionic-cationic reaction.

33. The method of claim 32, wherein the colorant of the first material is anionic, and wherein causing an anionic-cationic reaction comprises providing a cationic second material to cause the colorant to precipitate out of the first material upon contact of the first and second materials.

34. The method of claim 32, wherein the colorant of the first material is cationic, and wherein causing an anionic-cationic reaction comprises providing an anionic second material to cause the colorant to precipitate out of the first material upon contact of the first and second materials.

35. The method of claim 20, wherein the colorant is a dye.

36. The method of claim 20, wherein the colorant is a pigment.

37. The method of claim 1, wherein causing a reaction comprises inhibiting migration of the colorant into the object.

38. The method of claim 9, wherein the pH reaction decreases solubility of the colorant.

39. The method of claim 20, wherein forcing the colorant to become insoluble and precipitating the colorant out of the first material comprises inhibiting migration of the colorant and reducing penetration of the colorant into the object.

40. The method of claim 26, wherein the pH reaction decreases solubility of the colorant.

* * * * *

UNITED STATES PATENT AND TRADEMARK OFFICE
CERTIFICATE OF CORRECTION

| | | |
|---|---|---|
| PATENT NO. | : 7,645,403 B2 | Page 1 of 1 |
| APPLICATION NO. | : 10/603896 | |
| DATED | : January 12, 2010 | |
| INVENTOR(S) | : Jeffrey Allen Nielsen et al. | |

It is certified that error appears in the above-identified patent and that said Letters Patent is hereby corrected as shown below:

In column 10, line 7, in Claim 27, delete "PH," and insert -- pH, --, therefor.

Signed and Sealed this

Sixth Day of July, 2010

David J. Kappos
*Director of the United States Patent and Trademark Office*